United States Patent
Öhlmann

(10) Patent No.: US 8,167,359 B2
(45) Date of Patent: May 1, 2012

(54) ASSEMBLY CONFIGURATION

(75) Inventor: Jörg Öhlmann, Weiterstadt (DE)

(73) Assignee: GM Global Technology Operations LLC, Detroit, MI (US)

( * ) Notice: Subject to any disclaimer, the term of this patent is extended or adjusted under 35 U.S.C. 154(b) by 291 days.

(21) Appl. No.: 12/399,544

(22) Filed: Mar. 6, 2009

(65) Prior Publication Data

US 2009/0223980 A1    Sep. 10, 2009

(30) Foreign Application Priority Data

Mar. 7, 2008   (DE) .......................... 10 2008 013 122

(51) Int. Cl.
    *B60N 99/00* (2006.01)
(52) U.S. Cl. ..................................... 296/187.01; 296/30
(58) Field of Classification Search ............... 296/30, 296/187.02, 204, 187.01; 220/676
    See application file for complete search history.

(56) References Cited

U.S. PATENT DOCUMENTS

| | | | |
|---|---|---|---|
| 3,132,891 A | | 5/1964 | Pyuro et al. |
| 4,325,560 A | * | 4/1982 | Hirvonen ...................... 280/838 |
| 6,053,564 A | * | 4/2000 | Kamata et al. .................. 296/30 |
| 6,709,047 B2 | | 3/2004 | Burge |
| 7,077,461 B2 | * | 7/2006 | Ratet ......................... 296/187.02 |
| 7,192,071 B2 | * | 3/2007 | Watanabe et al. ............... 296/30 |
| 7,475,910 B1 | * | 1/2009 | Calonge et al. ................ 280/839 |
| 2004/0124666 A1 | | 7/2004 | Stahl |
| 2007/0122510 A1 | | 5/2007 | Mendiboure et al. |

FOREIGN PATENT DOCUMENTS

DE    10325928 A1    2/2004
DE    10237962 A1    3/2004

OTHER PUBLICATIONS

German Patent Office, German Search Report for Application No. 102008013122.9, dated Nov. 27, 2008.

* cited by examiner

*Primary Examiner* — Lori Lyjak
(74) *Attorney, Agent, or Firm* — Ingrassia Fisher & Lorenz, P.C.

(57) ABSTRACT

An assembly configuration for a motor vehicle is provided that includes, but is not limited to a first assembly and a second assembly, a channel being at least partially implemented between the first assembly and the second assembly, a bulkhead plate being positioned transversely to the main direction of the channel and a gap being at least partially implemented between the lateral edge of the bulkhead plate and at least one of the assemblies.

7 Claims, 1 Drawing Sheet

ASSEMBLY CONFIGURATION

CROSS-REFERENCE TO RELATED APPLICATION

This application claims priority to German Patent Application No. 102008013122.9, filed Mar. 7, 2008, which is incorporated herein by reference in its entirety.

TECHNICAL FIELD

The invention relates to an assembly configuration for a motor vehicle. This assembly configuration comprises a first assembly and a second assembly. A channel is at least partially implemented between the first assembly and the second assembly.

BACKGROUND

During the production of an automobile, various assemblies are connected to one another. For example, a front wall and a forward frame may be connected to one another. As a result of the construction, it may occur that the assemblies do not lie flatly on one another, but rather channels are formed between the assemblies. In such a case, small parts such as screws and the like are to be prevented from falling through the gap into the interior of the vehicle during the assembly of the vehicle. The small parts may only be retrieved with difficulty or not at all under certain circumstances. However, these loose small parts would cause noises during operation of the finished vehicle.

It is at least one object of the invention to provide an assembly configuration which is simple to produce, and which reduces the danger of small parts that cause noise. In addition, other objects, desirable features, and characteristics will become apparent from the subsequent detailed description and the appended claims, taken in conjunction with the accompanying drawings and this background.

SUMMARY

The assembly configuration according to an embodiment of the invention comprises a first assembly and a second assembly, a channel being at least partially implemented between the first assembly and the second assembly. For example, the assemblies may be a front wall and a forward frame. The channel between the assemblies is formed where the assemblies do not lay directly one on another or are not connected directly to one another. The channel has a main direction. This direction is to be understood as the direction along which the liquids located in the channel would flow or small parts would fall. According to an embodiment of the invention, a bulkhead plate is positioned transversely to the main direction of the channel and a gap is at least partially formed between the lateral edge of the bulkhead plate and at least one of the assemblies.

The term "transversely to the main direction" particularly indicates that the bulkhead plate is positioned at an angle of about 90° to the main direction. However, the angle may also be in a range from about $\geq 85°$ to about $\leq 95°$ or about $\geq 80°$ to about $\leq 100°$. The gap located between the lateral edge of the bulkhead plate and one of the assemblies may permit draining liquids to pass, but retain small parts. These small parts may then still be removed during the assembly of the vehicle. The assembly configuration is easy to produce and reduces the danger of small parts which cause noise. The bulkhead plate may be dimensioned in such a way that the gap has a width of about $\geq 2$ mm to about $\leq 4$ mm, for example.

The bulkhead plate is preferably provided with at least one through opening. Such a through opening permits a larger quantity of liquid to flow through. Furthermore, it results in a savings of material and thus costs during the production of the bulkhead plate. It is also possible that the bulkhead plate has multiple through openings. They may then be implemented as a perforated pattern, for example.

The bulkhead plate especially preferably also comprises an elastic spacer. The elastic spacer may be implemented as a deflectable elastic tongue. The spacer is placed under tension by the introduction of the bulkhead plate into the channel between the assemblies and causes a solid seat of the bulkhead plate by its restoring force. Overall, a free space is kept open between the bulkhead plate and the assemblies, through which possibly occurring liquids may flow.

The bulkhead plate particularly comprises an anchoring element, which is implemented to clip into one of the assemblies. The anchoring element is inserted into an opening of the assembly provided for this purpose and engages therein. The clipping may be performed without tools and ensures that a formfitting connection of the bulkhead plate to the assembly is constructed.

The anchoring element preferably forms a twist lock. For this purpose, the anchoring element may be implemented as non-round, in particular polygonal, for example, rectangular around its circumference, and be inserted into a corresponding opening. An incorrect installation may thus also be prevented.

For this purpose, the anchoring element may comprise an elastically restoring deflectable tongue, which has a recess to accommodate an assembly wall. Upon clipping, the edge of the opening in the assembly engages in the deflectable tongue. The bulkhead plate is fixed in this way. Furthermore, flapping of the bulkhead plate is suppressed in this way.

An anchoring element and/or an elastic spacer are preferably situated in the bulkhead plate coplanar to a main face of the bulkhead plate. The anchoring element, the spacer, and the plate face itself lie in one plane. It is thus possible that the bulkhead plate may also be inserted in strongly curved assemblies (i.e., clipped in, for example).

An anchoring element and/or an elastic spacer are especially preferably situated in the bulkhead plate perpendicular to a main face of the bulkhead plate. The bulkhead plate may thus be stabilized against tilting movements.

In particular, the bulkhead plate is implemented in one piece and the material of the bulkhead plate comprises plastic. Examples of suitable plastics are thermoplastic polymers such as polyethylene or polypropylene or polyamide or thermosetting polymers such as polyurethanes. It is thus possible that the bulkhead plate may be produced simply and cost-effectively using injection molding.

The bulkhead plate is preferably designed in such a way that it has at least one mirror plane. The bulkhead plate may be installed both on the left and also on the right due to such a symmetrical shape. This makes the installation easier. The mirror plane may lie in the main plane of the bulkhead plate or perpendicular thereto, for example.

The embodiments of the invention also relates to a motor vehicle which has an assembly configuration which may be implemented and refined as described above.

The embodiments of the invention are explained in greater detail hereafter with reference to the appended drawings on the basis of a preferred exemplary embodiment.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
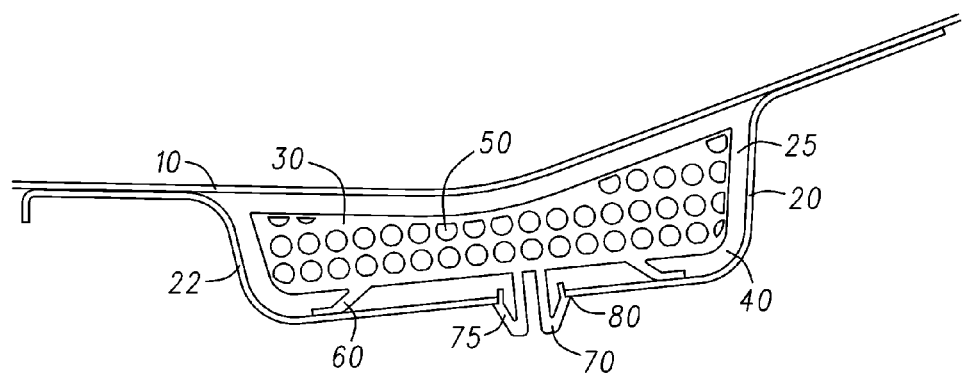
FIG. 1 shows a schematic side view of the assembly configuration according to an embodiment of the invention.

A first assembly 10, which is located on top in FIG. 1, of the assembly configuration according to an embodiment of the invention is a front wall of a motor vehicle, and a second assembly 20, which is located on the bottom, is a forward frame 22 forming a channel 25 therebetween. Upon the insertion of a bulkhead plate 30, an anchoring element 70 was guided through a hole in the forward frame 22 provided for this purpose and dimensioned correspondingly. Elastically restoring deflectable tongues 75 of the anchoring element 70 are initially compressed. Upon further insertion, a wall of the forward frame 22 bounding the hole reaches a recess 80. The tongues 75 rebound outward and the recess 80 blocks the anchoring element 70 from coming out.

Upon insertion of the bulkhead plate 30, elastic spacers 60, which are implemented here as springy tongues, are also pressed against the forward frame 22 and compressed in the direction of the bulkhead surface. Their restoring force also fixes the bulkhead plate 30.

The bulkhead plate 30 is dimensioned in such a way that a gap 40 is left open between its edge and the front wall 10 and/or the forward frame 22. Small quantities of liquid may thus flow through without being retained. Larger quantities of liquids may additionally drain through openings 50.

Figure 2:
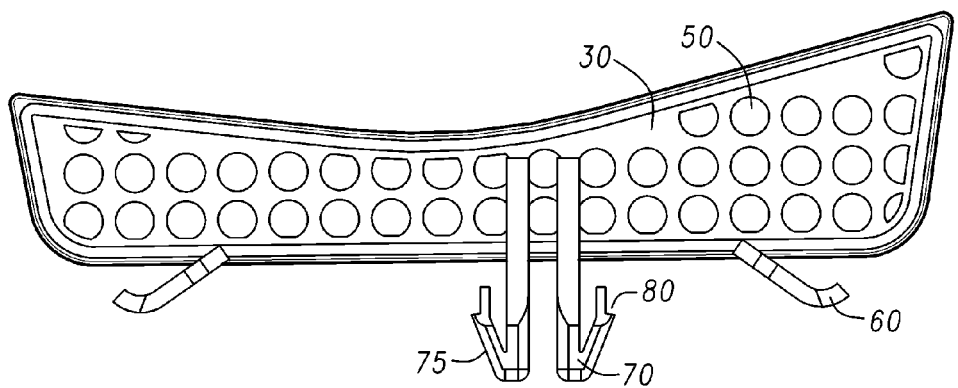
FIG. 2 shows a schematic detail view of a bulkhead plate from FIG. 1.

As shown in FIG. 2, the bulkhead plate 30 comprises two elastic spacers 60 and two anchoring elements 70. The recesses 80 are provided on the exterior side of the anchoring elements 70. The bulkhead plate 30 has a plurality of through openings 50.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. An assembly configuration for a motor vehicle, comprising:
   a first assembly;
   a second assembly;
   a channel being at least partially implemented between the first assembly and the second assembly; a bulkhead plate positioned transversely to a main direction of the channel; and a gap at least partially implemented between a lateral edge of the bulkhead plate and at least one of the first assembly or the second assembly, wherein the bulkhead plate comprises an elastic spacer, and wherein at least one of an anchoring element or the elastic spacer is situated in the bulkhead plate substantially perpendicular to a main face of the bulkhead plate.

2. The assembly configuration according to claim 1, wherein the bulkhead plate comprises an anchoring element adapted to clip into one of the first assembly or the second assembly.

3. The assembly configuration according to claim 1, wherein the bulkhead plate comprises at least one through opening.

4. The assembly configuration according to claim 1, wherein the anchoring element comprises an elastically restoring deflectable tongue having a recess to accommodate an assembly wall.

5. The assembly configuration according to claim 1, wherein at least one of the anchoring element or the elastic spacer is situated in the bulkhead plate that is substantially coplanar to a main face of the bulkhead plate.

6. The assembly configuration according to claim 1, wherein the bulkhead plate is a one piece and a material of the bulkhead plate comprises plastic.

7. The assembly configuration according to claim 1, wherein the bulkhead plate comprises at least one mirror plane.

* * * * *